(12) United States Patent
Brokenshire et al.

(10) Patent No.: US 6,621,492 B2
(45) Date of Patent: Sep. 16, 2003

(54) METHOD AND APPARATUS USING PRIMITIVE BOUNDING VOLUMES TO IMPROVE THE ACCURACY OF BSP-TREES

(75) Inventors: Daniel Alan Brokenshire, Round Rock, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 09/740,525

(22) Filed: Dec. 18, 2000

(65) Prior Publication Data

US 2002/0075260 A1 Jun. 20, 2002

(51) Int. Cl.$^7$ ............................................... G06T 15/00
(52) U.S. Cl. ....................................................... 345/420
(58) Field of Search ................................. 345/419, 420, 345/428, 619; 707/101, 102

(56) References Cited

U.S. PATENT DOCUMENTS 4,694,404 A * 9/1987 Meagher ..................... 345/421
6,373,485 B2 * 4/2002 Sowizral et al. ............. 345/421
6,396,492 B1 * 5/2002 Frisken et al. .............. 345/420
6,400,846 B1 * 6/2002 Lin et al. ..................... 382/199

\* cited by examiner

*Primary Examiner*—Phu K. Nguyen
(74) *Attorney, Agent, or Firm*—Duke W. Yee; Mark E. McBurney; Lisa L. B. Yociss

(57) ABSTRACT

A method, system, and program product for creating a child node of a binary space partitioning (BSP) tree node that better approximates the size of an object to be rendered is provided. In one embodiment, a a binary space partitioning tree is created. A rendering process then determines whether either a top node or a child node in a first level of child nodes is a good approximation of the object to be rendered. If not, then the rendering process modifies the binary space partitioning tree to include a new child node having boundaries that are closer to the maximum coordinates of primitives defining the object than are the boundaries of the top node or of the child nodes in the first level of child nodes. This new child node may have a bounding volume that overlaps the bounding volumes of other child nodes in the BSP tree.

24 Claims, 4 Drawing Sheets

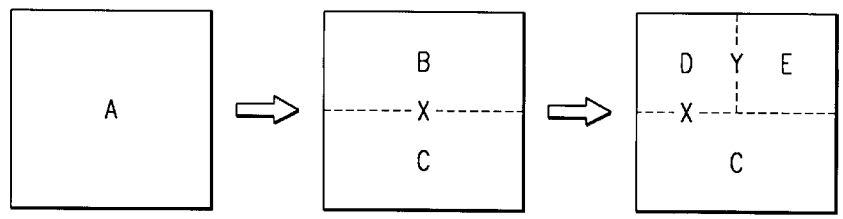
FIG. 3A
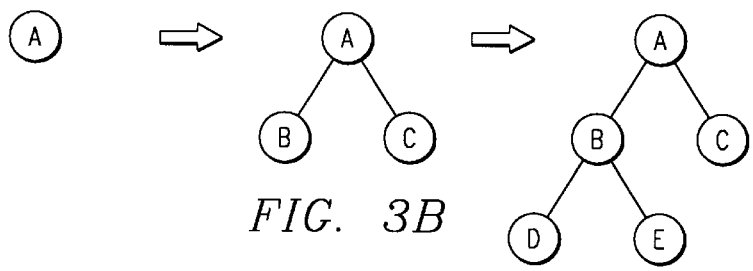
FIG. 3B
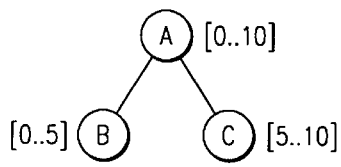
FIG. 4A
| OBJECT | BEST APPROXIMATING POLYTOPE |
|---|---|
| [0..4] | [0..5] |
| [4..6] | [0..10] |
| [5..10] | [5..10] |
FIG. 4B
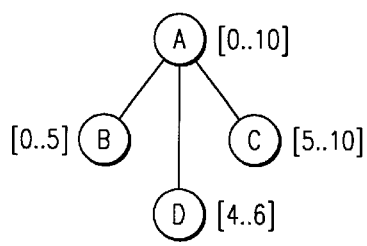
FIG. 5A
| OBJECT | BEST APPROXIMATING POLYTOPE |
|---|---|
| [0..4] | [0..5] |
| [4..6] | [4..6] |
| [5..10] | [5..10] |
FIG. 5B

METHOD AND APPARATUS USING PRIMITIVE BOUNDING VOLUMES TO IMPROVE THE ACCURACY OF BSP-TREES

CROSS REFERENCE TO RELATED APPLICATION

The present application is related to co-pending U.S. patent application Ser. No. 09/740,526 entitled "TIGHTENED BOUNDING VOLUMES FOR BSP-TREES" filed Dec. 18, 2000. The content of the above mentioned commonly assigned, co-pending U.S. patent application is hereby incorporated herein by reference for all purposes.

BACKGROUND OF THE INVENTION

1. Technical Field

The present invention relates generally to an improved graphics subsystem and in particular to a method and an apparatus for processing binary space partitioning (BSP) trees. Still more particularly, the present invention provides a method and an apparatus for improving the accuracy of the bounding volumes for BSP-trees.

2. Description of the Related Art

The display of two and three dimensional graphic images of complex scenes in real time have improved greatly as hardware and software have improved. These images are very complex, so efficient processing is of utmost importance. Binary space partitioning (BSP) trees were introduced in the early 1980's (See Fuchs, Kedem, and Nayor, "On Visible Surface Generation by A Priori Tree Structures", SIGGRAPH '80, pp. 124–133, the content of which is hereby incorporated by reference for all purposes) to aid in the processing of 3-D scenes.

BSP trees are a standard tool in image processing and are continually being improved through refinement. A BSP tree divides an n-dimensional space into two components using an n-1 dimensional object. For example, a 0 dimensional point on a line divides the 1 dimensional line into two components. Alternatively, a 1 dimensional line divides a 2 dimensional plane into two components. For a 3 dimension scene, a 2 dimensional plane divides the scene into two components.

The process of subdivision continues recursively to subdivide an n-dimensional space into smaller components called polytopes. A polytope is a generalization of a polyhedron. Informally, it is a multi-dimensional solid with flat sides. The faces are the hyper-planes that are subdividing the n-dimensional space. Storing these polytopes in a BSP tree allows the n-dimensional space to be classified and sorted in a manner that assists in carrying out other processing tasks, such as hidden surface removal.

Polytopes can approximate objects in the n-dimensional space. Therefore, it would be advantageous to have improved bounding volumes in a BSP tree to make graphics processing more efficient.

SUMMARY OF THE INVENTION

The present invention provides a method, system, and program product for creating a child node of a binary space partitioning (BSP) tree node that better approximates the size of an object to be rendered. In one embodiment, a a binary space partitioning tree is created. A rendering process then determines whether either a top node or a child node in a first level of child nodes is a good approximation of the object to be rendered. If not, then the rendering process modifies the binary space partitioning tree to include a new child node having boundaries that are closer to the maximum coordinates of primitives defining the object than are the boundaries of the top node or of the child nodes in the first level of child nodes. This new child node may have a bounding volume that overlaps the bounding volumes of other child nodes in the BSP tree.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A shows a two dimensional space subdivided by "hyperplanes" to form subspaces;

FIG. 3B shows the BSP tree constructed based on the subdivisions in FIG. 3A;

FIG. 4A shows a one dimensional space subdivided by points to form subspaces;

FIG. 4B shows the best approximating subspaces for a set of objects based on the subspaces in FIG. 4A;

FIG. 5A shows a one dimensional space subdivided by points to form subspaces with additional subspaces added to better represent regions overlapping two or more subspaces in accordance with a preferred embodiment of the invention;

FIG. 5B shows the best approximating subspaces for a set of objects based on the subspaces in FIG. 5A in accordance with a preferred embodiment of the invention;

DETAILED DESCRIPTION OF THE PREFERRED EMBODIMENT

Figure 1:
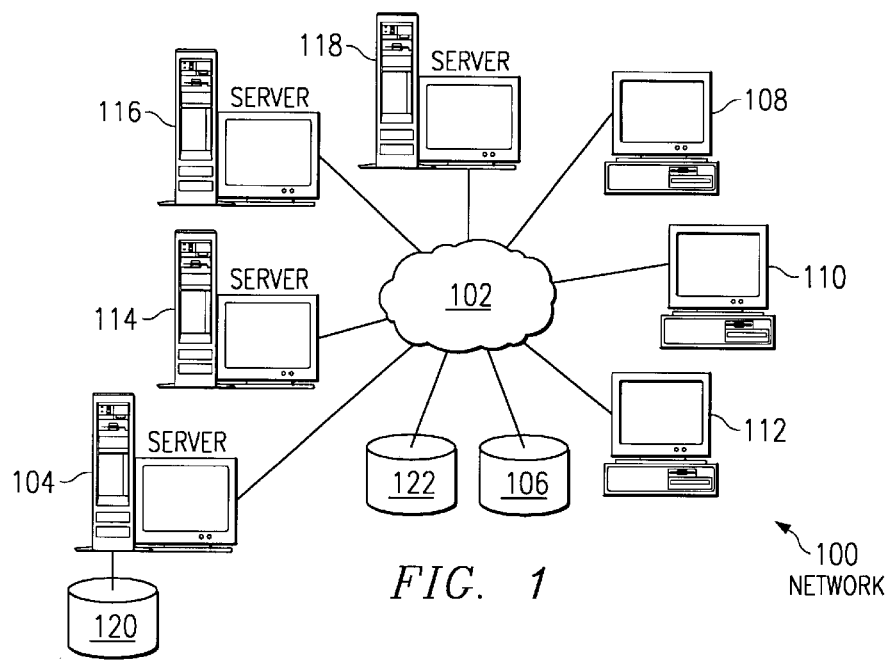
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100.

Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. The present invention works locally on a particular machine, such as client 108, to improve the processing of graphic images. The source of these images may be network 102, such as an interactive game being played on the network.

Figure 2:
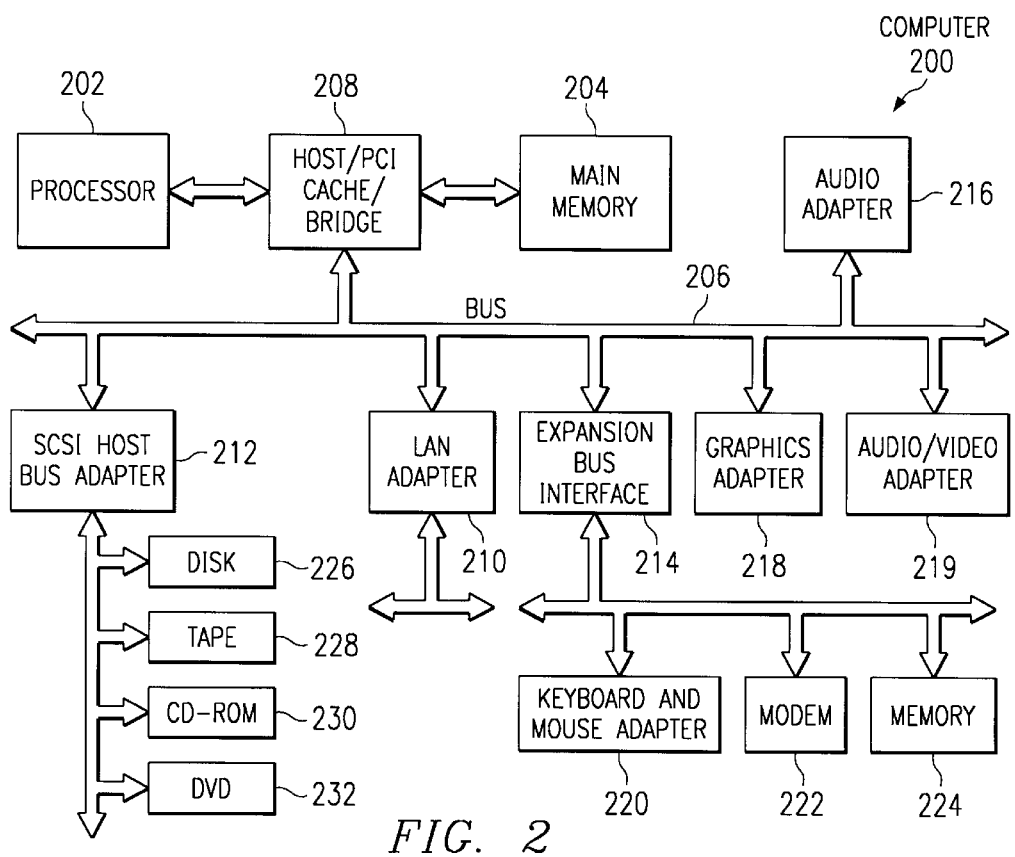
FIG. 2 is a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. The hardware and software to support the present invention would commonly be found on graphics adapter 218.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

A BSP-tree is best introduced using a simple example. FIG. 3A shows a two dimensional object, plane A, that is divided into subplanes B and C by the line X. Line X is a one dimensional example of a hyper-plane that divides an 2-dimensional space into two components. In the right hand image, the subplane B is further subdivided into the subplanes D and E by the line Y. From a more general perspective, in the right hand image there are three polytopes, C, D, and E, formed by two hyperplanes, X and Y.

FIG. 3B shows the BSP tree constructed as a result of subdividing the 2-dimensional plane. The left hand tree has a single node, A, representing the entire space. Space A is divided into subspaces B and C by hyperplane X, so the two subspaces, B and C, become children of the node A, as seen in the tree in the middle.

Every time a space is subdivided by a hyperplane, the children of the node are the two subspaces that are formed. So when hyperplane Y divides subspace B into components D and E, the node B in the BSP tree now has children D and E. This process continues as the original space is recursively subdivided into smaller and smaller polytopes.

As one of ordinary skill in the art will appreciate, the discussion above with a two dimensional space being subdivided by a one dimensional line can be extended to higher dimensions, such as 3D space being subdivided by 2D planes. This example can also be simplified to a one dimensional line being subdivided by a zero dimensional point, as shown in the next sequence of figures.

In FIG. 4A, the entire "space" is the one dimensional line segment A from 0 to 10. The midpoint at position 5 divides this space into subspaces B from 0 to 5 and C from 5 to 10.

As one of ordinary skill in the art will appreciate, any point, not just the midpoint, would divide the original segment into two components.

Given a partitioning of the original space into arbitrary objects, the problem to be solved is to find the polytope that best approximates each object. A "best" approximation of a object means a polytope that fully includes the object and has the least additional space outside the object. This is best understood by example.

In FIG. 4B, the space 0 to 10 has been partitioned into three objects, the line segments [0 . . . 4], [4 . . . 6], and [6 . . . 10]. There are three polytopes available to act as approximations for these objects: A from [0 . . . 10], B from [0 . . . 5], and C from [5 . . . 10]. The best approximation of object [0 . . . 4] is polytope B [0 . . . 5] and the best approximation of object [6 . . . 10] is polytope C [5 . . . 10]. A problem arises with the object [4 . . . 6] which is not fully contained in either polytope B or C formed by partitioning the original space A. In fact, only the original polytope A can approximate this object and it is obvious that this is a very poor approximation. This is the problem addressed by this invention.

In the prior art, a BSP tree is formed as each space in the tree is subdivided into two subspaces by a hyperplane. These two subspaces are non-overlapping and their union form the original space. There are two basic approaches to deciding on the location of the hyperplanes dividing the space into subspaces. In the first approach, the hyperplanes are chosen so as to best fit the objects in the image. This is a computationally expensive approach and, despite the computational effort, the result will not be optimal due to the complexity of the image, particularly when a 3-dimensional image is considered. The second approach is to select the hyperplanes in a computationally efficient manner, such as using the midpoint of a line segment. After the BSP tree is built, when it is detected that an object does not fit into an existing subspace well, corrective actions are taken to improve the BSP tree. This invention uses the second approach and it is the "corrective actions" that are the central idea of the invention.

In the present invention, the formation of a BSP tree is modified in two significant ways. First, the subdivisions of a space can be into two or more subspaces. Second, the subspaces can overlap and need not be disjoint. The significance of these changes can be appreciated by reexamining the example from FIG. 4.

In FIG. 5A, a BSP tree is formed by partitioning the line segment A [0 . . . 10] into the two segments B [0 . . . 5] and C [5 . . . 10]. Additionally, a new segment D [4 . . . 6] is added to the structure to provide a better fit for the object [4 . . . 6]. FIG. 5B has the same three objects as FIG. 4B. There are four polytopes available to act as approximations for these objects: A [0 . . . 10], B [0 . . . 5], C[5 . . . 10], and D [4 . . . 6]. As shown in the right hand column of the table, the best approximation for [0 . . . 4] is B, the best approximation for [4 . . . 6] is D, and the best approximation for [6 . . . 10] is C. The approximation of the object [4 . . . 6] by D is a significant improvement over the approximation by A in the prior art.

Figure 6A:
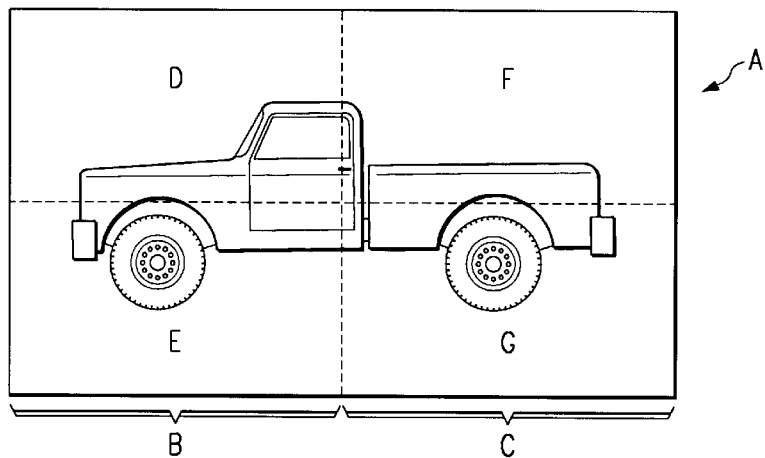
FIG. 6A shows a two dimensional space containing an image of a pickup truck subdivided by lines to form subspaces.

For a more realistic example, FIG. 6A shows a two dimensional plane A containing an image of a pickup truck. The plane A is subdivided vertically to form subplanes B and C. The subplane B is subdivided horizontally to form the subplanes D and E. In a similar manner, the subplane C is subdivided horizontally to form the subplanes F and G. These polytopes are formed in a computationally efficient manner by bisecting each plane in the opposite direction of the previous bisection. This approach is simple but does not take into consideration the image being displayed.

Figure 6B:
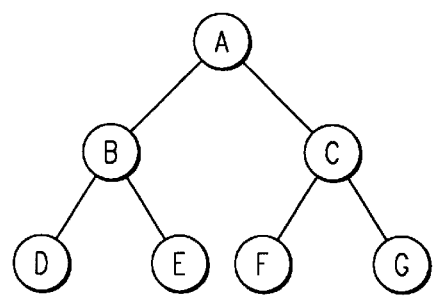
FIG. 6B shows the BSP tree constructed based on the subspaces in FIG. 6A.

FIG. 6B shows the BSP tree constructed based on the subspaces in FIG. 6A. The plane A is the root of the tree and its two subplanes B and C are the children of node A. In a similar manner, nodes D and E are children of node B and nodes F and G are children of node C. The image of the pickup spans subplanes D, E, F, and G and it also spans subplanes B and C. Therefore, using the prior art, the best approximation of the image of the pickup is the entire plane, A. In the following figures it is shown how the present invention greatly improves the approximation of the image of the pickup truck.

Figure 7A:
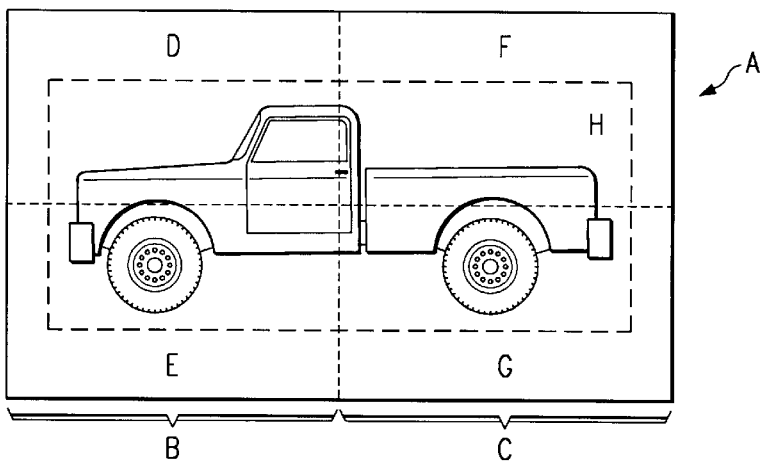
FIG. 7A shows a two dimensional space containing an image of a pickup truck subdivided by lines to form subspaces with an additional subspace added to better represent the pickup truck in accordance with a preferred embodiment of the invention.

FIG. 7A shows the same two dimensional space containing an image of a pickup truck as in FIG. 6A. The same initial subplanes, A through G, are formed by recursively subdividing subspaces. When it is discovered the image of the pickup truck can only be approximated by the entire plane A, a new subplane, H, is defined to better approximate the image of the pickup truck.

Figure 7B:
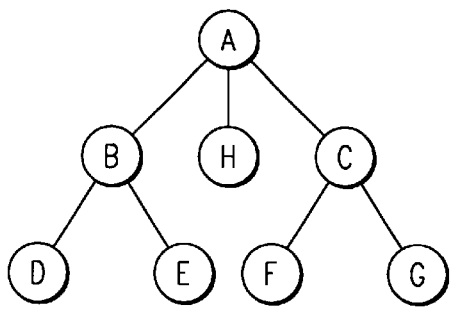
FIG. 7B shows the BSP tree constructed based on the subspaces in FIG. 7A in accordance with a preferred embodiment of the invention.

FIG. 7B shows the BSP tree constructed based on the subspaces in FIG. 7A in accordance with a preferred embodiment of the invention. The tree is similar to that shown in FIG. 6B, but the node H has been added as a child of the node A. When this tree is searched to find the best approximation of the image of the pickup truck, subspace H is found to be a much better approximation than subspace A that was found using the prior art.

Figure 8:
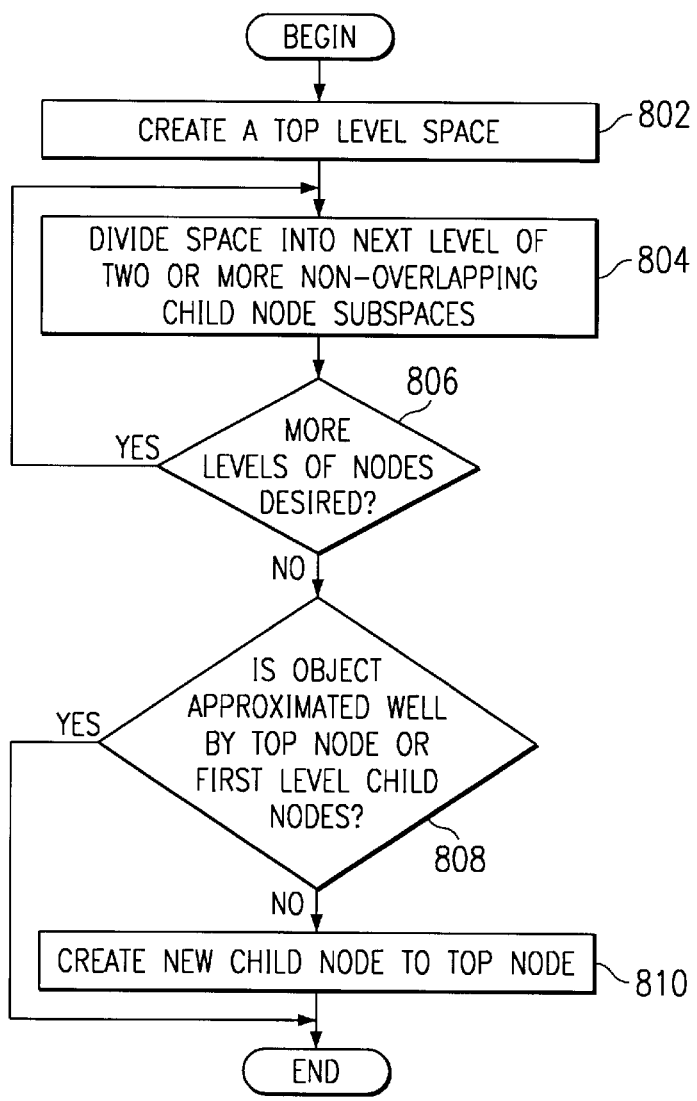
FIG. 8 depicts a flowchart illustrating an exemplary process and data flow for determining the values of the bounds of the subspaces in accordance with the present invention.

With reference now to FIG. 8, a flowchart illustrating an exemplary process and data flow for determining the values of the bounds of the subspaces is depicted in accordance with the present invention. To begin, a space is defined, using the methods of the prior art, that includes the entire object that is to be rendered and displayed to a user (step 802). Next, the space is divided into a first level of two or more non-overlapping child node subspaces (step 804). The process of dividing the space into a next level of two or more non-overlapping child node subspaces is continued until the desired number of levels of subspaces is achieved (step 806). Each node at each level does not need to have the same number of nodes or levels of nodes beneath it as other nodes at the same level. Thus, steps 802–806 comprise the prior method of creating a BSP tree.

Once the desired number of levels of node subspaces has been created, the rendering process analyzes the top node and first level child nodes to determine how well the node approximates the size of the object to be rendered and displayed (step 808). If the top node or one of the first level child nodes is a good approximation for the size of the object to be rendered, then the process of creating a BSP tree ends and the rendering process proceeds with other aspects of rendering the image. If neither the top node nor one of the first level child nodes is a good approximation for the size of the object to be rendered as determined by analyzing the maximum coordinate values of the primitives defining the object as compared to the maximum coordinate values of each node, then the rendering process creates a new child node subspace of the top level space that has bounds that are coextensive or just larger than the bounds of the maximum coordinate values of the primitives defining the object (step 810). One reason the first level child nodes previously created may not be a good approximation of the object is that the object may span two or more child nodes as is the case of the pickup depicted in FIG. 7A. The new child node of the top level space, having a better approximation of the object, may contain areas that overlap areas of other child nodes of the top level space. For example, in FIG. 7A, node (or space) A has child nodes B, H, and C. Child node H corresponds to the new child node that is created in step 810 that better approximates the object image than does the parent space A. Also, child node H overlaps the space covered by nodes B and C.

Thus, for example, if a user moved the image of the pickup depicted in FIG. 7A to the right to such that the complete extent of subspaces C, G, and F were removed from the viewable area of the display, but only parts of subspaces B, D, and E were removed from the viewable areas, without utilizing the present invention, the entire left portion of the pickup as contained within node B would need to be rendered because the rendering process would have no way of knowing which parts of the image within node B had been removed. However, utilizing the present invention, if the entire bounds of node H were also removed from the viewable area of the user's display, the rendering process would be able to determine that none of the image of the pickup needed to be rendered since no part of the pickup would be displayed to the user. Thus, the present invention improves the speed of rendering by eliminating unnecessary bus traffic from input/output devices and eliminates unnecessary use of the processor.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method for creating a child node of a binary space partitioning tree node that better approximates the size of an object to be rendered, the method comprising:

creating a binary space partitioning tree wherein when nodes are subdivided a parent node is subdivided into equal-sized, non-overlapping child nodes which together occupy the entire space of the parent node;

responsive to a determination that neither a top node nor a child node in a first level of existing, non-overlapping child nodes, wherein the first level is immediately below a top level that contains the top node, is a good approximation of the object to be rendered, modifying the binary space partitioning tree to include a new child node in the first level having boundaries that are closer to the maximum coordinates of primitives defining the object than are the boundaries of the top node and the child nodes in the first level of child nodes, wherein the new child node in the first level overlaps at least one of the existing child nodes in the first level.

2. The method as recited in claim 1, wherein the determination that neither a top node nor a child node in a first level of child nodes is a good approximation of the object to be rendered comprises a determination that the object to be rendered spans more than one of the child nodes in the first level of child nodes.

3. The method as recited in claim 1, wherein the determination that neither a top node nor a child node in a first level of child nodes is a good approximation of the object to be rendered comprises a determination that the top node includes a dead space that can be eliminated from a node having a reduced bounding volume.

4. The method as recited in claim 1, wherein the object to be rendered is a representation of a three dimensional object and the nodes are polyhedrons.

5. The method as recited in claim 4, wherein the polyhedrons are rectangular solids.

6. The method as recited in claim 1, wherein the object to be rendered is a two dimensional object and the nodes are polygons.

7. The method as recited in claim 6, wherein the polygons are rectangles.

8. The method as recited in claim 1, wherein the volume of the new child node overlaps at least a portion of the volume of one or more of the child nodes in the first level of child nodes.

9. A computer program product in a computer readable media for use in a data processing system for creating a child node of a binary space partitioning tree node that better approximates the size of an object to be rendered, the computer program product comprising:

first instructions for creating a binary space partitioning tree wherein when nodes are subdivided a parent node is subdivided into equal-sized, non-overlapping child nodes which together occupy the entire space of the parent node;

second instructions, responsive to a determination that neither a top node nor a child node in a first level of existing, non-overlapping child nodes, wherein the first level is immediately below a top level that contains the top node, is a good approximation of the object to be rendered, for modifying the binary space partitioning tree to include a new child node in the first level having boundaries that are closer to the maximum coordinates of primitives defining the object than are the boundaries of the top node and the child nodes in the first level of child nodes, wherein the new child node in the first level overlaps at least one of the existing child nodes in the first level.

10. The computer program product as recited in claim 9, wherein the determination that neither a top node nor a child node in a first level of child nodes is a good approximation of the object to be rendered comprises a determination that the object to be rendered spans more than one of the child nodes in the first level of child nodes.

11. The computer program product as recited in claim 9, wherein the determination that neither a top node nor a child node in a first level of child nodes is a good approximation of the object to be rendered comprises a determination that the top node includes a dead space that can be eliminated from a node having a reduced bounding volume.

12. The computer program product as recited in claim 9, wherein the object to be rendered is a representation of a three dimensional object and the nodes are polyhedrons.

13. The computer program product as recited in claim 12, wherein the polyhedrons are rectangular solids.

14. The computer program product as recited in claim 9, wherein the object to be rendered is a two dimensional object and the nodes are polygons.

15. The computer program product as recited in claim 14, wherein the polygons are rectangles.

16. The computer program product as recited in claim 9, wherein the volume of the new child node overlaps at least a portion of the volume of one or more of the child nodes in the first level of child nodes.

17. A system for creating a child node of a binary space partitioning tree node that better approximates the size of an object to be rendered, the system comprising:

first means for creating a binary space partitioning tree wherein when nodes are subdivided a parent node is subdivided into equal-sized, non-overlapping child nodes which together occupy the entire space of the parent node;

second means, responsive to a determination that neither a top node nor a child node in a first level of existing, non-overlapping child nodes, wherein the first level is immediately below a top level that contains the top node, is a good approximation of the object to be rendered, for modifying the binary space partitioning tree to include a new child node in the first level having boundaries that are closer to the maximum coordinates of primitives defining the object than are the boundaries of the top node and the child nodes in the first level of child nodes, wherein the new child node in the first level overlaps at least one of the exisitng child nodes in the first level.

18. The system as recited in claim 17, wherein the determination that neither a top node nor a child node in a first level of child nodes is a good approximation of the object to be rendered comprises a determination that the object to be rendered spans more than one of the child nodes in the first level of child nodes.

19. The system as recited in claim 17, wherein the determination that neither a top node nor a child node in a first level of child nodes is a good approximation of the object to be rendered comprises a determination that the top node includes a dead space that can be eliminated from a node having a reduced bounding volume.

20. The system as recited in claim 17, wherein the object to be rendered is a representation of a three dimensional object and the nodes are polyhedrons.

21. The system as recited in claim 20, wherein the polyhedrons are rectangular solids.

22. The system as recited in claim 17, wherein the object to be rendered is a two dimensional object and the nodes are polygons.

23. The system as recited in claim 22, wherein the polygons are rectangles.

24. The system as recited in claim 17, wherein the volume of the new child node overlaps at least a portion of the volume of one or more of the child nodes in the first level of child nodes.

* * * * *

UNITED STATES PATENT AND TRADEMARK OFFICE
CERTIFICATE OF CORRECTION

PATENT NO. : 6,621,492 B2
APPLICATION NO. : 09/740525
DATED : September 16, 2003
INVENTOR(S) : Brokenshire et al.

It is certified that error appears in the above-identified patent and that said Letters Patent is hereby corrected as shown below:

On Title Page Item -74-
(74) Attorney, Agent, or Firm: delete "Mark E. McBumey" and insert --Mark E. McBurney--.

Signed and Sealed this

First Day of May, 2007

JON W. DUDAS
*Director of the United States Patent and Trademark Office*